United States Patent
Tabirian et al.

(10) Patent No.: US 6,269,108 B1
(45) Date of Patent: Jul. 31, 2001

(54) MULTI-WAVELENGTHS INFRARED LASER

(75) Inventors: Anna M. Tabirian, Maitland; Hans P. Jenssen, Palm Harbor, both of FL (US); Scott Buchter, Somerville, MA (US); Hanna J. Hoffman, Palo alto, CA (US)

(73) Assignee: University of Central Florida, Orlando, FL (US)

( * ) Notice: Subject to any disclaimer, the term of this patent is extended or adjusted under 35 U.S.C. 154(b) by 0 days.

(21) Appl. No.: 09/577,388

(22) Filed: May 25, 2000

Related U.S. Application Data

(60) Provisional application No. 60/135,977, filed on May 26, 1999.

(51) Int. Cl.⁷ .................................................. H01S 3/14
(52) U.S. Cl. .............................. 372/39; 372/75; 372/70; 372/68; 372/22
(58) Field of Search ................... 372/39, 70, 75, 372/22, 68

(56) References Cited

U.S. PATENT DOCUMENTS

| | | | |
|---|---|---|---|
| 4,321,559 | 3/1982 | Esterowitz et al. | 372/41 |
| 4,330,763 | 5/1982 | Esterowitz et al. | 372/41 |
| 5,070,507 | 12/1991 | Anthon | 372/41 |
| 5,200,966 | 4/1993 | Esterowitz et al. | 372/71 |
| 5,313,477 | 5/1994 | Esterowitz et al. | 372/6 |
| 5,742,632 * | 4/1998 | Barnes et al. | 372/68 |
| 6,015,765 * | 1/2000 | Haribson et al. | 501/40 |

OTHER PUBLICATIONS

Long–Wavelength Stimulated Emission Via Cascade Laser Action in Ho;YLF, L. Esterowitz, et al., *Applied Physics Lett.* 35 (3) 1 Aug. 17, 99, pp. 236–239.

Three Wavelength Laser Emission in Ho;YLF Via Sequential Cascade, R. C. Eckardt, eta l., *Agency for Defense Development*, pp. 380–382.

* cited by examiner

*Primary Examiner*—Leon Scott, Jr.
(74) *Attorney, Agent, or Firm*—Brian S. Steinberger; Law Offices of Brian S. Steinberger

(57) ABSTRACT

A long wavelength infrared laser system is disclosed where radiation from laser sources such as frequency-doubled Nd:YAG or a Cr:LiSAF is used to resonantly pump a gain medium consisting of a holmium-doped fluoride crystal having a high active ion concentration. The laser pump source has a pulse duration that may be short enough to gain switch a particular transition or long enough to allow end-pumping with high energy densities without damage. The gain material has an absorption approximately resonant with the pump source wavelength, and the dopant concentration is selected to maximize absorption strength for a given excitation. The output radiation from the laser system consists of one or more wavelengths including, in particular 3.9 nm but also other infrared wavelgths such as 1.4 $\mu$m, 2.9 $\mu$m and 3.4 $\mu$m., several of which may be produced simultaneousely from the same laser material through the mechanism of cascade transitions.

41 Claims, 8 Drawing Sheets

MULTI-WAVELENGTHS INFRARED LASER

This invention claims priority based on U.S. Provisional Application Ser. No. 60/135,977 filed May 26, 1999

FIELD OF THE INVENTION

This invention relates to solid state lasers, and in particular to a method and apparatus of generating at room temperature one or more wavelengths in the infrared part of the spectrum using high concentration Holmium-doped fluoride crystals to maximize resonant pump absorption.

BACKGROUND AND PRIOR ART

It is well known that the trivalent holmium ion ($Ho^{3+}$) is capable of producing stimulated emission at several different wavelengths across the infrared, from 0.75 to just under 4.0 $\mu$m. For the purpose of generating longer wavelengths, fluoride crystals are a preferred host for the holmium ion because the energy levels are spaced sufficiently apart within the different manifolds to mitigate against rapid multiphonon non-radiative transitions which would otherwise inhibit fluorescence at wavelengths longer than about 3 $\mu$m. Thus, while the Ho transition near 2.9 $\mu$m has been made to lase in many different crystals including oxides and garnets, only fluorides exhibited stimulated emission beyond 3 $\mu$m. It is further known that because of the rich energy level structure of Ho, a multiplicity of wavelengths can be generated through sequential transitions between intermediate levels.

One of the most interesting Ho transitions is the one near 4 $\mu$m between the $^5I_6$ and $^5I_5$ levels. There are very few active ion-host crystal combinations that have been successfully lased this far into the infrared, and none that have demonstrated operation levels substantially greater than a few millijoules at or near room temperature. In the case of Ho:YLF, as will be described below, stimulated emission at 3.9 $\mu$m was achieved, but under conditions that severely limit prospects for further energy and power scaling to levels that are of interest. The main issue limiting laser action at 3.9 $\mu$m in Ho-doped crystals, including most known fluorides, is the long fluorescence lifetime of the lower $^5I_6$ laser level coupled with the self-terminating nature of the $^5I_5 \rightarrow ^5I_6$ transition. The long $^5I_6$ lifetime—up to a few milliseconds for most fluoride materials—limits the repetition rate of the corresponding laser transition, whereas the much shorter lifetime of the upper $^5I_5$ level—typically, no more than a few 10's of microseconds, results in an effective three-level system for the laser transition. While it is known in the art that cooling of a three level laser medium can be used to more easily achieve and sustain inversion, this approach is generally considered unattractive for practical laser systems because of added complexity and weight. It has further been recognized that an alternative way to overcome an unfavorable lifetime ratio is through use of resonant pumping, whereby the upper laser level is directly excited by a narrow band source with frequency selected or tuned to match an absorption line that is dynamically connected to the upper level of the desired transition. When the resonant pump source also has a very short pulse duration (up to about 100 nanoseconds) it is said to "gain switch" the particular transition, in much the same way Q-switching a laser oscillator produces short duration pulses.

Resonant pumping for the purpose of generating mid-infrared wavelengths from activator ions in various hosts has often been employed in the prior art. For example, in the invention disclosed in U.S. Pat. No. 5,200,966 to Esterowitcz and Stoneman, the $^4I_{11/2}$ upper laser state of the erbium ion was directly pumped with a pump beam at a wavelength of about 970 nm, causing the erbium ion to produce laser emission at substantially 2.8 $\mu$m, corresponding to the $^4I_{11/2} \rightarrow ^4I_{15/2}$ laser transition, with high efficiency at room temperature. Because high power diode laser arrays with wavelengths in the 950–980 nm range have recently become more available, there have been several successful efforts demonstrating diode pumped, power scalable cw operation from Er-doped lasers. However, pulsed operation has been more elusive at or near 3 $\mu$m, even under seemingly favorable resonant pumping conditions. In another example, U.S. Pat. No. 4,330,763 to Esterowitcz and Kruer taught use of resonant pumping from a laser source at 2.06 $\mu$m to achieve inversion on the $^7F_3 \rightarrow ^7F_5$ line at 4.1 $\mu$m from terbium-doped YLF. A large ratio of non-radiative to radiative decay rates in this gain material discriminates against broad-band pumping, but allows the use of resonant, narrow-band excitation to produce laser action. Heretofore, Holmium-doped lasers have also been made which are capable of pulsed operation in the infrared region of the spectrum upon resonant pumping by radiation from Nd:YAG lasers with output near 1 $\mu$m. In particular, pulsed emission at or near 3 $\mu$m from Ho-doped garnets such as YAG, GGG and YALO was described wherein co-doping with suitable activator ion such as praseodymium (Pr) was utilized to allow resonant pumping near 1 $\mu$m. For example, Anton in U.S. Pat. No. 5,070,507 describes a laser system wherein a Nd-doped laser operating on a non-standard line of 1.123 $\mu$m is used to pump holmium laser to produce a moderately high energy output pulse at about 3 $\mu$m. Key to the invention by Anton was the incorporation of holmium ion with concentrations in excess of 15% (atomic percent) and a much lower praseodymium (Pr) concentration (on the order of 0.01%). The higher Ho concentration allowed preferential lasing on the 2.94 $\mu$m line in Ho-doped garnet crystals upon pumping with the 1.12 $\mu$m output of a Nd:YAG laser, whereas the Pr ion served to quench the lifetime of the lower $^5I_7$ laser level, thereby breaking the bottleneck of the normally self-terminating $^5I_5 \rightarrow ^5I_6$ transition.

In the early demonstrations of the long wavelength transitions in $Ho^{3+}$-doped YLF using resonant pumping of the $^5S_2$ manifold with short pulse green lasers, laser action on the 3.9 $\mu$m line was achieved as part of a sequence with other transitions, a process known in the art as cascade lasing. Specifically, using a frequency-doubled short pulse (20 ns) Nd:glass laser operating at 535 nm to pump a 1% Ho:YLF crystal, the two-line $^5S_2 \rightarrow ^5I_5$, $^5I_5 \rightarrow ^5I_6$ (1.392 $\mu$m, 3.914 $\mu$m) and $^5S_2 \rightarrow ^5I_5$, $^5I_5 \rightarrow ^5I_7$ (1.392 $\mu$m, 1.673 $\mu$m) cascade transitions were successfully lased at room temperature (see L. Esterowitz, R. C. Eckardt and R. E. Allen, Appi. Phys. Lett., 35,236, (1979)). Three-step laser transitions, for example at 3.4 $\mu$m, 3.9 $\mu$m and 2.9 $\mu$m were also reported (see R. C. Eckart, L. Esterowitz and Y. P. Lee, Procs. Int'l Conf. Lasers, pp. 380 (1981)) in Ho:YLF using the longer 1 $\mu$s pulse from a pulsed dye laser tuned to 535.5 nm. These and similar results were further described in U.S. Pat. No. 4,321,559 to Esterowitz and Eckardt. A key feature in these early descriptions of resonantly pumped cascade lasing was that cascade processes, whereby one laser transition sequentially pumps a lower laser transition in the same material, could be viewed as one form of resonant self-pumping. By causing population inversion to occur sequentially, cascade laser action can therefore improve the efficiency of laser transitions between intermediate manifolds, as well as produce radiation consisting of two or more wavelengths. In the case of short pulse green laser excitation of the high lying $^5S_2$ state, cavity optics can be selected to preferentially lase a given sequence of transitions. For example, by using one set of coated optics, the excited $^5S_2$ state population could be directly transferred to the intermediate $^5I_5$ level, which then serves as the upper level for a subsequent 3.9 µm laser transition to the $^5I_6$ level. A different set of cavity mirrors cause the second lasing step to occur on the 1.7 µm $^5I_5 \rightarrow ^5I_7$ line.

Yet, although prior art describing the advantages of resonant pumping and multi wavelengths cascade lasing was related nearly two decades ago, to date no practical Ho-doped laser has been constructed with one output wavelength near either the 2.9 µ or 3.9 µm lines, using principles taught by Esterowitcz and Eckardt. One problem with prior art systems based on resonant pumping is that they require a laser with a wavelength tuned closely to an appropriate absorption band of the laser material. For example, in the case the Ho ion, lasing at 3.9 µm was previously obtained only as part of a sequence of cascade transitions, by resonantly pumping the $^5I_8$ ground state to the $^5S_2$, $^5F_4$ level. To increase the pumping efficiency, the green beam had to be tuned close to the appropriate absorption peak, which in fluorides is near 535 nm. This wavelength matches up poorly with most readily available commercial lasers, which is one of the factors precluding practical application of such cascade lasers. Similarly, the methods and system disclosed by Anthon for generating 2.9 µm radiation from Ho-doped garnets, while recognizing the benefits to improved efficiencies that could be obtained by increasing holmium concentrations, still required a pump laser tuned to 1.1 µm, which is a difficult wavelength to obtain from a practical laser system, especially if short pulse operation is desired as well. Thus, even if pump lasers with wavelengths suitable for pumping holmium could be constructed, other conditions on the pulse duration, energy, repetition rate, and beam quality may place additional limitations on practical implementation of the infrared laser system with the output power, wavelengths and efficiency desired.

SUMMARY OF THE INVENTION

It is therefore one object of the present invention to disclose a means for achieving efficient room temperature laser operation at 3.9 µm from a Holmium-doped fluoride crystal pumped by a practical pulsed source tuned to a resonance, and with pulse duration short enough to allow population inversion between the upper $^5I_5$ level and the long lived $^5I_6$ lower laser level.

It is another object of the invention to disclose a pulsed Ho-doped laser operatively configured as a 2.9 µm or 3.9 µm downconverter for a shorter wavelength laser that is available as a commercial source. Examples of such sources include the 532 nm from frequency-doubled Nd:YAG or Nd:Vanadate, a Ti:sapphire or Cr:LiSAF laser tuned to about 890 nm, a fosterite or fiber Raman laser operating near 1.2 µm.

It is an additional object to be able to efficiently accomplish said downconversion utilizing short pulse (nanosecond) pump lasers, thereby gain switching the transitions near 2.9 and/or 3.9 µm so as to produce short pulses at these infrared wavelengths.

It is still another object to generate one or more different wavelengths in the infrared between 750 nm and 4 µm, but specifically including the wavelengths near 2.9 and/or 3.9 µm, utilizing resonant pumping of Holmium-doped fluoride crystal with a shorter wavelength pump laser.

It is a further object to provide a method and system for generating said output wavelengths alone or in a cascade with other infrared wavelengths at output energies scalable to over 10 millijoules and with repetition rates scalable to over 10 Hz.

It is yet another object to disclose methods for generating energy scalable longer infrared wavelengths at room temperature using a resonant pump source with pulse duration that is sufficiently long to enable efficient pumping even from end-pumped configurations. It is therefore a special object to be able to operate the pump laser at energy densities that are well above the threshold for sustained laser oscillation while staying below damage thresholds to sensitive IR coatings. In various embodiments of the invention such pump sources may include free running, or long pulse tunable Cr:LiSAF or Ti:sapphire lasers, frequency-doubled Nd-doped lasers, Raman fiber lasers and high power, quasi-cw semiconductor laser arrays.

A system and method is disclosed for generating at least one long infrared wavelength from a holmium-doped fluoride laser source pumped by a resonant pulsed narrow-band source. The invention includes pump sources with short enough pulse durations to gain switch a particular transition and also pump sources with long pulses but sufficiently high energy dsensity to overcome the saturation density associated with the transition. Of particular importance to the present invention are techniques for selecting the Holmium concentration so as to optimize absorption at a wavelength that is available as a practical commercial laser source.

In preferred embodimets of the invention the particular wavelengths of 3.9 mm and 2.9 µm are generated alone or in sequence with each other or with other wavelengths including but not limited to 1.4 µm, 2.4 µm and 2.0 µm. Pump wavelengths include 532 nm, such as is available from stanfdard Nd-doped lasers, 890 nm from Cr:LiSAF, Ti:sapphire, or diode laser arrays and 1.2 µm from, for example fosterite Raman fiber laser Further objects and advantages of this invention will be apparent from the following detailed description of a presently preferred embodiment, which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
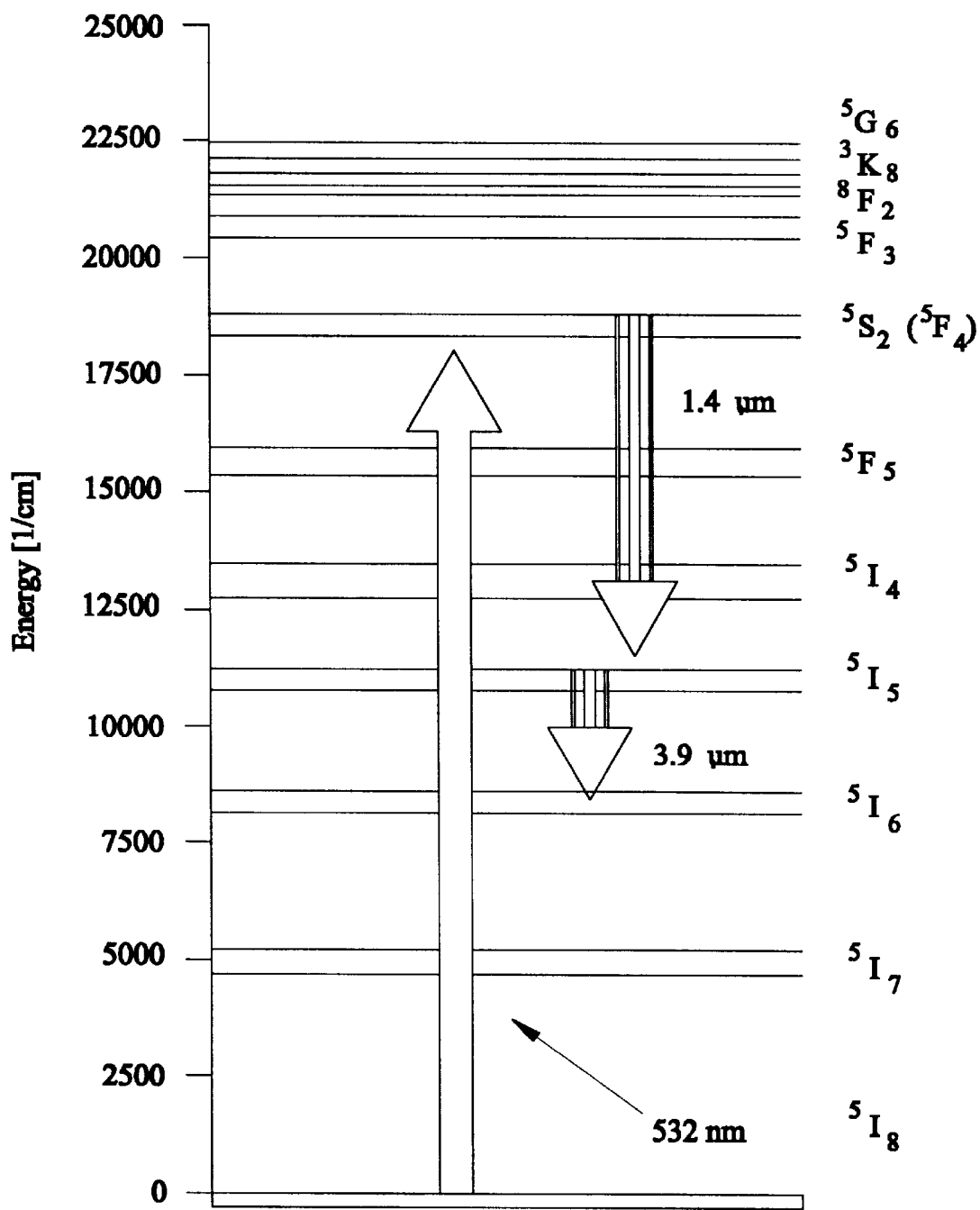
FIG. 1 shows an energy level diagram and a preferred embodiment of cascade lasing in a $Ho^{3+}$ doped fluoride material, such as Ho:BYF, using 532 µm pumping.

As earlier noted and to which now should be referenced, FIG. 1 portrays the cascade process involving the $^5S_2$—$^5I_5$ (1.4 $\mu$m) and $^5I_5$—$^5I_6$ (3.9 $\mu$m) cascade transitions in the output of one preferred embodiment using pulsed resonant pumping of a Ho:BYF such as $BaY_2F_8$ crystal at a wavelength of 532 nm. This corresponds to the frequency doubled wavelength of a common Nd-doped laser such as Nd:YAG or Nd:Vanadate. Ho-doped BYF was selected as the preferred crystal over the more commonly available Ho:YLF because it has generally longer fluorescence lifetimes, which favors stimulated emission between intermediate levels. Other Holmium-doped crystals that may be of interest but are not yet available commercially include H:NaYF (such as Ho:NaYF$_4$) and Ho:KYF (such as Ho:KY$_3$F$_{10}$)

For the purpose of validating the salient features of the present invention, key spectroscopic and dynamic characteristics were determined for both Ho:BYF and Ho:YLF crystals, at several concentrations between 1% and 20% (atomic percent). All the crystals were grown using a conventional Czochralski technique from purified starting materials. Crystals with the general properties described herein can be acquired conmmercially, for example, from AC materials, Inc.

Figure 2:
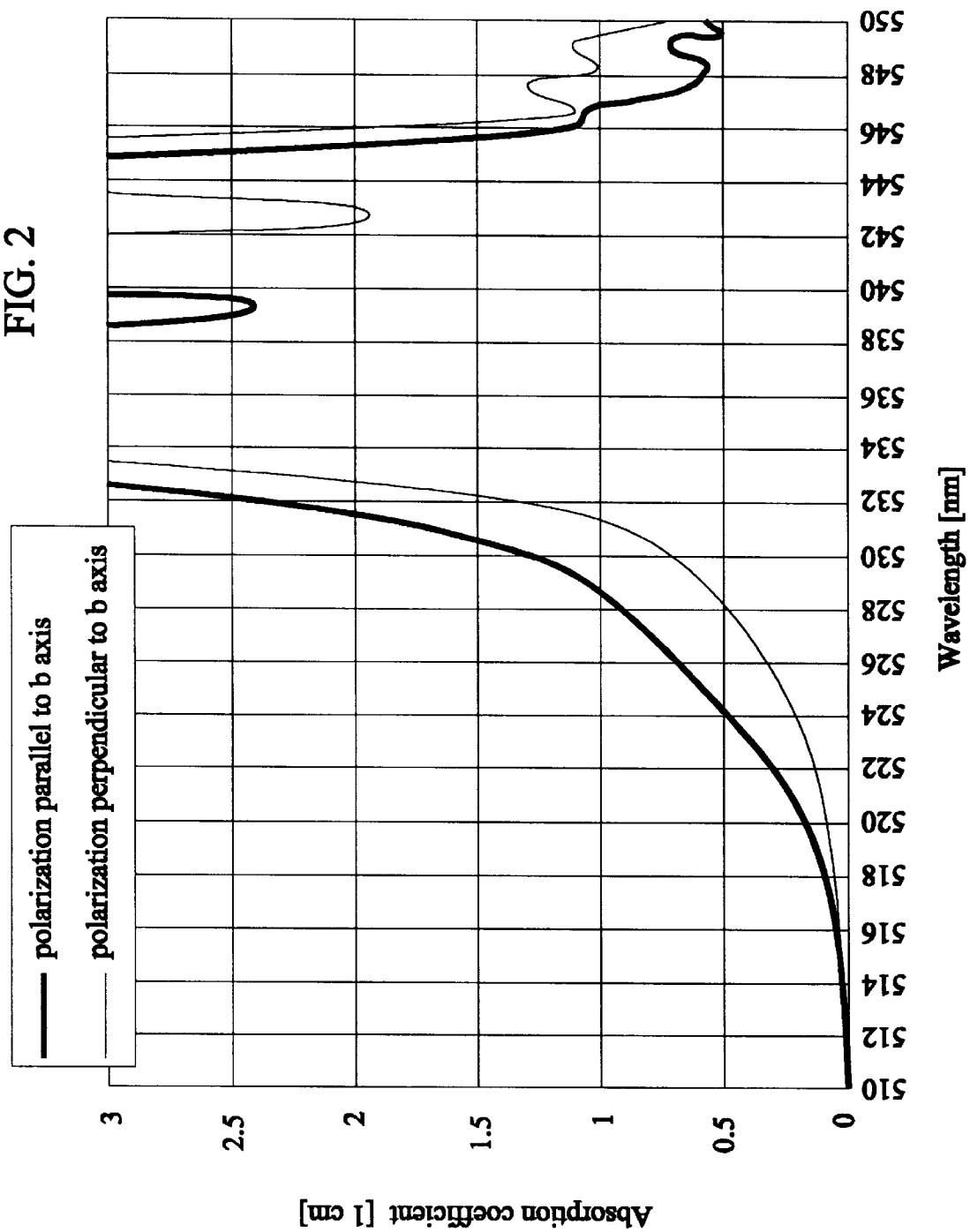
FIG. 2 shows the absorption spectrum of 10% Ho:BYF in the 532 nm spectral range.

As a key element of the invention, higher concentrations of the active Ho ion are used principally to increase the absorption strength and to also extend the absorption bandwidth, thereby allowing effective excitation off the peak of the absorption curve. The absorption at 532 nm was measured for both Ho:YLF and Ho:BYF at several concentrations. For Ho:YLF it was found to range from 0.6 cm$^{-1}$ for a 1% concentration sample to 5.6 cm$^{-1}$ in the 20% sample. The trend is similar for Ho:BYF. An absorption spectrum for the 10% Ho:BYF sample used in subsequent experiments is shown in FIG. 2, from which the absorption coefficient at 532 nm is measured at 2.42 cm$^{-1}$ for polarization parallel to the b-axis. This results in more than 50% absorption for a 5 mm long rod and would be adequate for laser end-pumped operation. For a 20% Ho:BYF sample, the 532 nm absorption was measured to be about a factor of 2 higher (for polarization in the X-Z plane) than in the 10% sample, i.e. about 4.8 cm$^{-1}$). Even with some uncertainty due to differing polarizations between the two samples, the measurement confirms the expected trend of increasing absorption with increasing Ho concentration.

It is also known that higher concentrations of the Ho ion enhance cross relaxation processes, shortening the effective lifetimes of certain levels, and increasing the efficiency of energy transfer processes. In particular, we find evidence of a strong $^5S_2$—$^5I_4$, $^5I_8$—$^5I_7$ cross relaxation process, as reflected in the radical decrease in the observed fluorescent lifetime of the $^5S_2$ level—from 280 $\mu$s in 1% Ho:BYF to about 16 $\mu$s in 10% Ho and to about 3.7 $\mu$s in a 20% sample. The lifetimes were determined by the standard 1/e method from time dependent fluorescence decay data detected with a 0.3 m monochromator, taking care to suppress any scattered light with an appropriate bandpass filter. This shortening of the $^5S_2$ lifetime would not, however, affect the efficiency of the laser transitions initiated at this level, including the one at 1.4 $\mu$m, as long as the pump pulse is shorter than about 3 $\mu$s. For comparison, it was noted that, in Ho:YLF, the $^5S_2$ lifetimes are considerably smaller than those measured in BYF (by factors of between 2 and 3) with a similar trend of substantial decrease in lifetime with increasing concentration. It is therefore expected that for gain switched pulses, using for example 532 nm excitation with Q-switched pulse durations of typically up to a few 10's of nanosecond, there would not be a substantial difference in laser performance between Ho:YLF and Ho:BYF for the cascade transitions of FIG. 1, at similar pump absorption strengths. However, for situations requiring longer pulse excitations, Ho:BYF offers a clear advantage, because of the longer lifetimes associated with all the intermediate levels. Longer pump pulses may be preferred, for example when higher energy storage is desired and/or coating damage limitations prescribe lower incident pump peak power densities.

It is further noted that time resolved fluorescence decay measurements of other intermediate levels in Ho:BYF revealed no significant lifetime quenching of either the $^5I_6$ or $^5I_7$ levels and only slight effect on the lifetime of the $^5I_5$ level (less than 10% decrease) even for 20% Ho concentrations. Therefore the dynamic behavior of the 3.9 $\mu$m laser transition should directly reflect the behavior of the preceding transition from $^5S_2$.

The weak dependence of the intermediate $^5I_6$ and $^5I_7$ level lifetimes on the holmium concentration is similar to that referenced in the prior art invention to Anton (U.S. Pat. No. 5,070,507) for holmium-doped garnets such as YAG and GGG, except that the corresponding lifetimes in fluorides are generally higher. However, although use of high concentration Ho for the purpose of increasing absorption of a pump source was taught by Anton, this was done only in reference to pumping the $^5I_6$ level with a Nd:YAG laser modified to emit near 1.1 $\mu$m, and demonstrating laser action on the 2.9 $\mu$m line by relying on energy transfer to a co-dopant such as Pr$^{3+}$ to suppress the $^5I_7$ lifetime and achieve inversion. More specifically, the measurements by Anton showed that incorporation of low concentrations of Pr could be used to eliminate self termination of the $^5I_6$→$^5I_7$ transition near 3 $\mu$m in Ho-doped garnets. It was not however realized by Anton that higher concentrations of Ho can also have the very beneficial use of enhancing absorption to a preferred level and allowing access to practical wavelengths available from standard commercial sources. Neither was it understood by Anton that by taking advantage of cascade transitions, further flexibility in selecting and tuning the pump wavelength can be realized, thereby giving rise to a multiplicity of wavelengths that can all be generated from a single Ho-doped material. It should be further pointed out that the present invention does not rely on a co-dopant, as the preferred embodiment employs pulsed pumping with short pulse durations which circumvent self-termination of the transitions of interest, including those shown in FIG. 1 as well as alternative transitions, such as the $^5I_6$→$^5I_7$ near 2.9 that will be described further below. As will also be described below, in another embodiment, long pulse pumping is employed but laser action is sustained by employing sufficiently high power densities. The possibility of employing such application of laser principles to a three-level transition was clearly not anticipated by Anton. The present invention does not, however, preclude use of a co-dopant for the purpose of selectively quenching lower level lifetimes and permitting scaling of the laser repetition rates, as long as conventional, commercially available, pump laser sources can be utilized to provide the excitation.

Therefore, a common element to all preferred embodiments of this invention, is that they result in a highly practical and cost effective infrared laser system that is also energy and power scalable.

Figure 3:
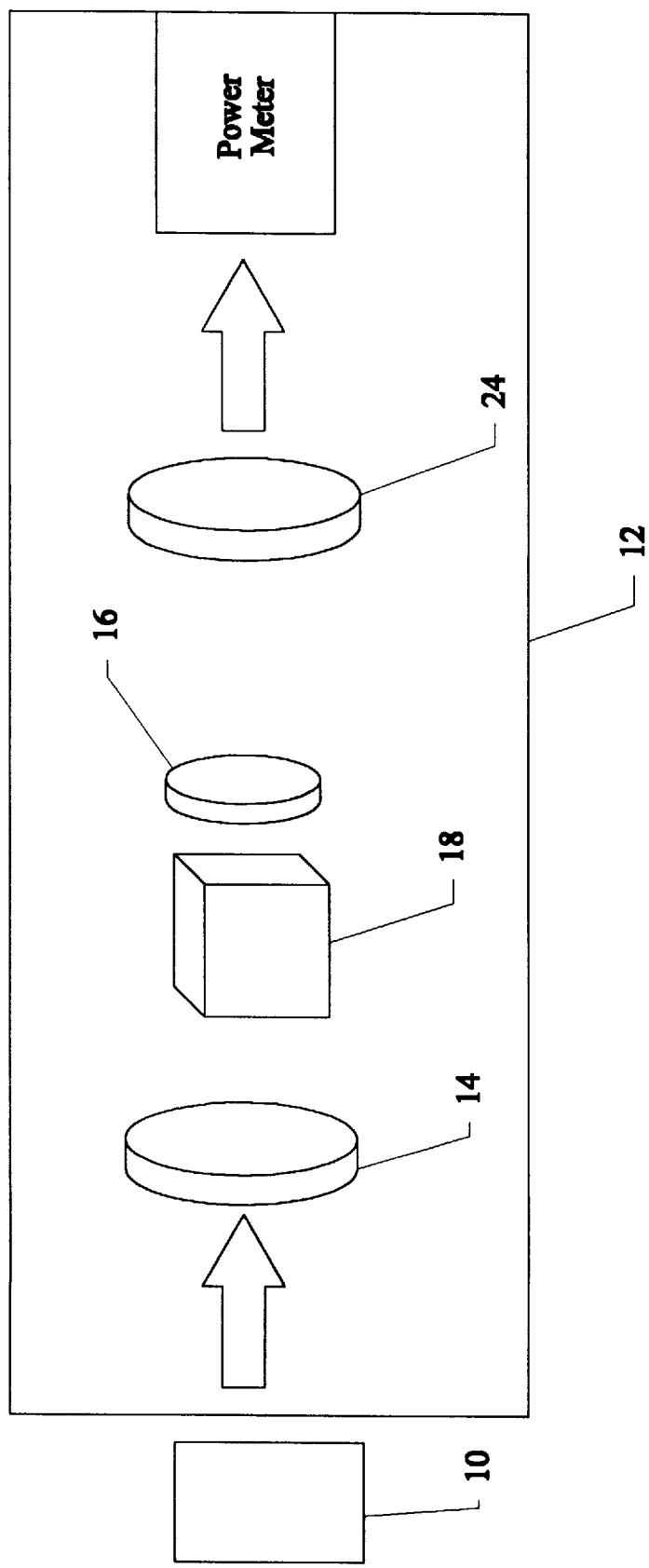
FIG. 3 shows the cavity layout for a preferred embodiment of gain switched 3.9 µm Ho:BYF laser resonantly end-pumped by short pulse Nd-doped 532 nm laser.

Referring now to FIG. 3, a cavity layout for a 4 $\mu$m Ho:BYF laser is portrayed with resonant pumping provided by a laser source 10, comprising in a preferred embodiment, a Q-switched, frequency-doubled Nd:YAG laser at 532 $\mu$m. The laser cavity 12 consists of a 1 m radius of curvature input mirror 14, HR coated for reflection at 1.4 and 3.9 $\mu$m, and a flat output coupler 16 coated for high reflection at 1.4 $\mu$m and about 94% reflection at 3.9 $\mu$m. The 6 mm long (uncoated) Ho:BYF crystal 18 is placed near the output coupler 16. The gain material 18 was end-pumped with 20 nsec long pulses at a repetition rate of 10 Hz. Also shown in FIG. 3 is a half-wave plate/polarizer combination 20 which could be used to continuously vary the pump energy, and a second halfwave plate 22 which allows optimal alignment of the pump polarization with respect to the crystal axis. A 3 mm long pass filter 24 was used to isolate the 3.9 $\mu$m radiation.

Figure 4:
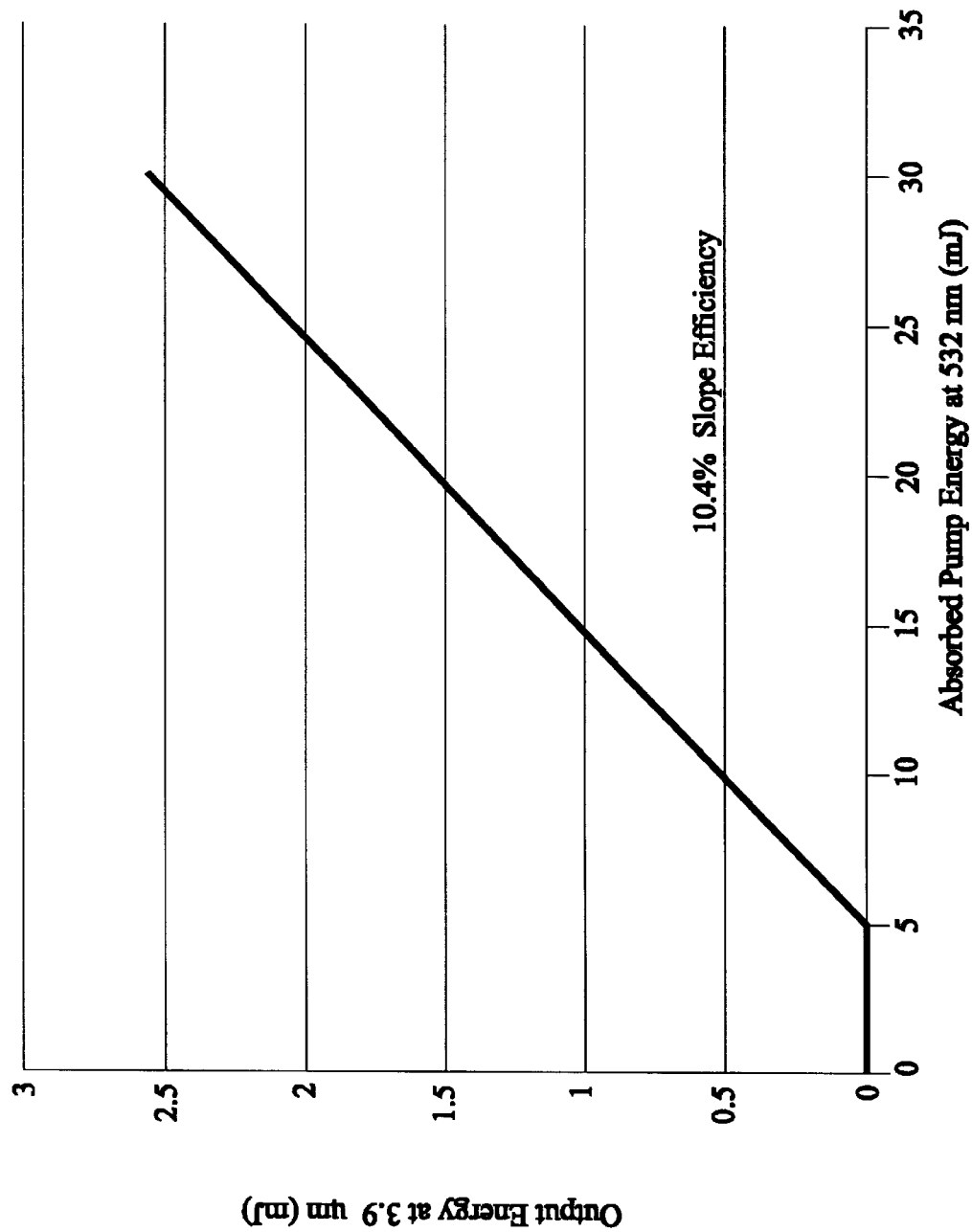
FIG. 4 shows a plot of the 3.9 µm output energy as a function of 532 nm absorbed input energy for cascade lasing in 10% Ho:BYF pumped by a Q-switched, frequency-doubled Nd:YAG laser.

Lasing at 1.4 $\mu$m for the foregoing example was readily achieved with a low threshold of less than 1 mJ absorbed pump energy. Threshold for cascade lasing at 3.9 $\mu$m was reached at approximately 5 mJ of absorbed (10 mJ incident) pump energy at 532 $\mu$m. FIG. 4 shows a plot of the measured output energy at 3.9 $\mu$m as a function of absorbed 532 nm pump energy. As the plot indicates, a maximum output energy of 2.6 mJ was achieved at an absorbed pump energy of 30 mJ. This corresponds to a slope efficiency of 10.4% or a quantum efficiency of $\mu$76.5%, which is near theoretical values.

These results are remarkable, given that the laser cavity of FIG. 3 does not represent an optimal arrangement, as neither the infrared coatings nor mode matching were fully optimized. Also since the crystal was not coated, Fresnel losses lowered the efficiency. It should therefore be realized that better, higher performance optics and coatings as well as fabrication of longer crystals to obtain still more pump absorption would further improve the overall efficiency of the infrared laser. A green laser pump source with longer pulses (preferably 100's of nanoseconds to a few microseconds) would be especially advantageous in reducing the risk of damage to the mirror coatings and allowing scaling to much higher output energies from end-pumped cavity designs. Principles of the method and system of this embodiment could therefore lead to a practical, energy scalable, short pulse laser at IR wavelengths not available from any other directly emitting solid state laser. The laser can be construed as a downconverter for standard pulsed green lasers, with an energy scaling potential limited primarily by coating damage.

The principal limitation of the laser of FIG. 1 is that repetition rates are limited by the lifetime of the $^5I_6$ level to less than about 100 Hz. It may. However, be possible to utilize a suitable co-dopant to quench the lower level lifetime, thereby allowing corresponding extention of the repetition rate. It should threrefore be understood that inclusion of co-dopant for the purpose of the scaling repetition rate of a 3.9 $\mu$m laser falls within the scope of the present invention.

A further advantage of the system of FIG. 1 is that laser designs can be constructed that also provide for efficient laser action at 1.4 $\mu$m, a wavelength which has several important applications including medical and eyesafe ranging and laser radar systems. Although the laser oscillator of FIG. 3 was not optimized for this wavelength, we estimate that slope efficiencies of up to 30% are feasible, making the embodiment of FIG. I an attractive option for generating this unique wavelength.

Many alternative designs of the 532 nm pumped 3.9 $\mu$m laser and/or 1.4 $\mu$m laser are possible, and fall under the scope of the present invention. These include alternative output coupling optics, using for example a dichroic prism to separate the two output wavelengths and side pumped configurations based on cavity designs that are known in the art. Although the preferred embodiment is described by reference to a frequency-doubled Nd:YAG as the pump laser, this should not be construed as limiting the domain of applicability of the invention. In particular, a number of other pulsed green laser sources can be advantageousely utilized to provide the pump radiation, including, but not limited to, frequency-doubled Nd:YALO and Nd:vanadate (such as Nd:YV0$_4$). Further increases in the Ho concentration to beyond 20% are also feasible, and will likely result in still greater absorption. There is however a trade-off against the $^5S_2$ lifetime which places an upper limit on desirable Ho concentration for a given pump pulse duration, and such trade-offs should be taken into account in designing a practical laser system based on high concentration Ho.

Figure 5:
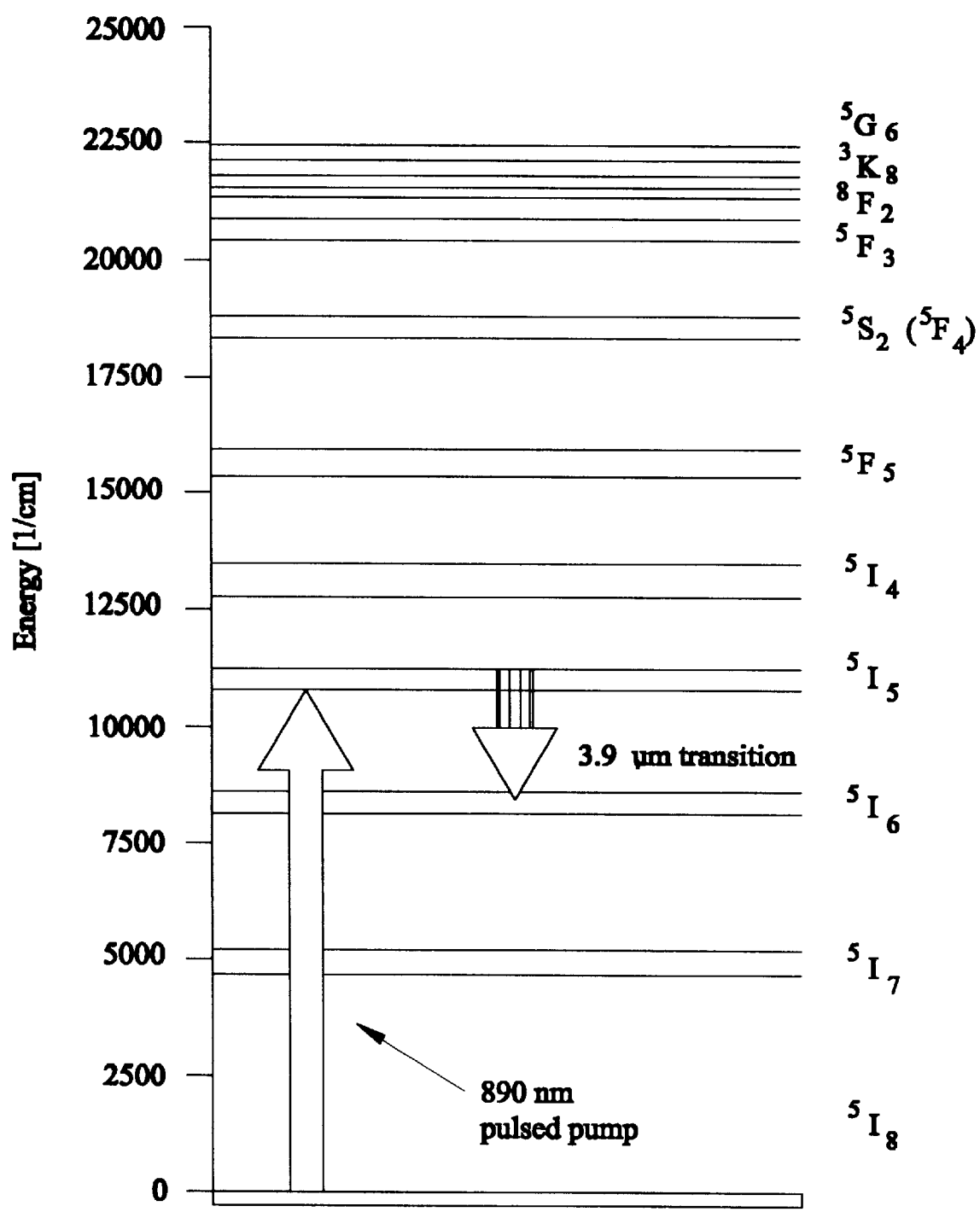
FIG. 5 shows another preferred embodiment for generating radiation at 3.9 µm from Ho-doped fluoride crystal resonantly pumped at 890 nm.
Figure 6A:
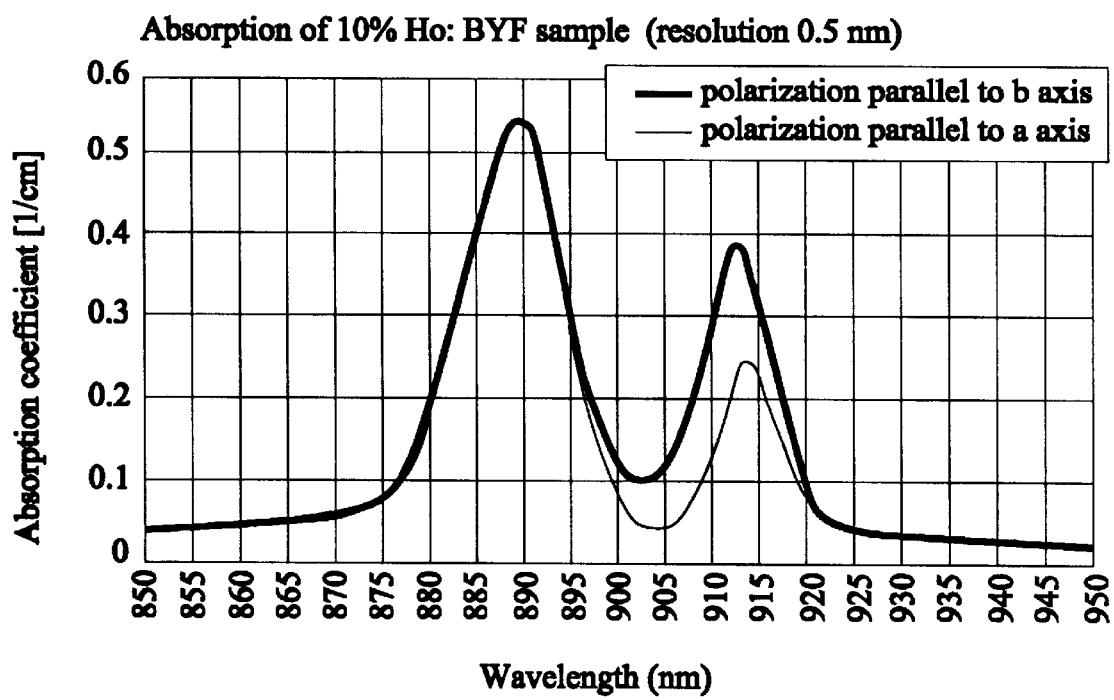
FIG. 6 shows an absorption spectrum near 890 nm for (a) 10% and (b) 20% Ho:BYF.
Figure 6B:
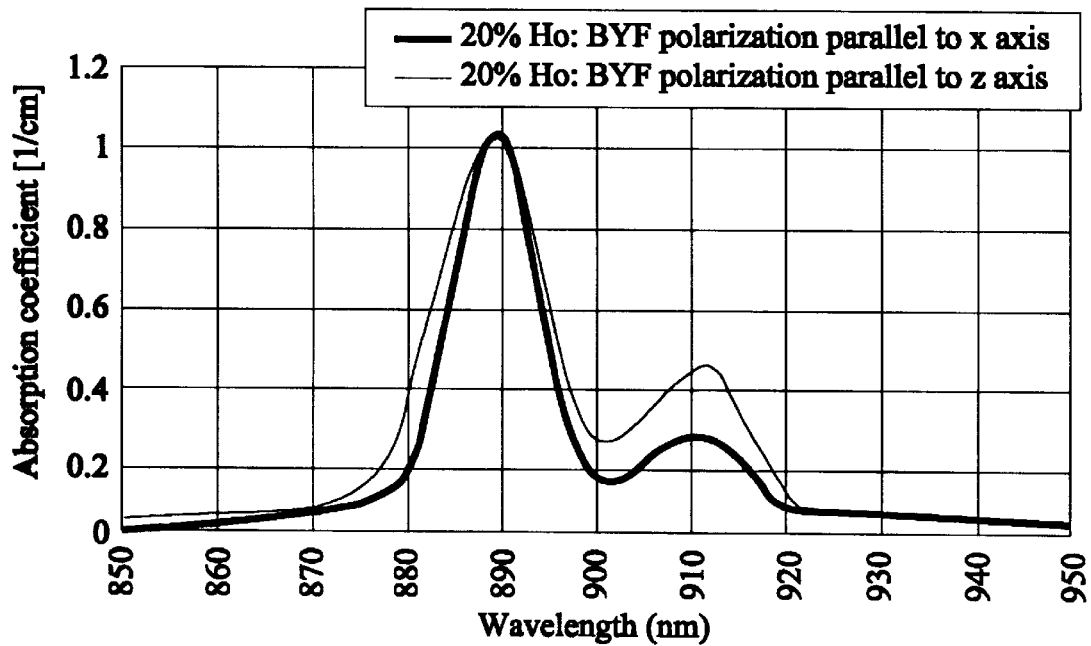

While the cascade process depicted in FIG. 1 represents an attractive option for e generating 3.9 $\mu$m radiation, some losses due to competing non-radiative decay channels and possible cross relaxation processes cannot be avoided, especially when materials with very high Ho concentration are utilized. The most efficient method for lasing the 3.9 $\mu$m transition is therefore to populate the $^5I_5$ level directly without exciting the higher lying levels. Accordingly, there is shown in FIG. 5 another preferred embodiment, of the invention whereby radiation tuned to approximately 890 nm corresponding to the $^5I_8 \rightarrow ^5I_5$ excitation is used to directly pump the upper level of the $^5I_5 \rightarrow ^5I_6$ transition. This pump wavelength is attractive because it corresponds to existing to tunable solid state lasers such as Ti:sapphire and Cr:LiSAF, and also matches the output available from high power laser diode arrays. The primary limitation to this approach is due to the relatively low absorption cross section for 890 nm transition. However, by going to increasingly higher Ho concentrations the absorption length can be considerably increased To illustrate the available absorption strength near 890 nm, FIG. 6 shows the absorption spectrum for (a) 10% and (b) 20% Ho:BYF in this spectral region. The absorption length derived from these measurements is about 0.5 cm$^{-1}$ for the 10% Ho, increasing to about 1 cm$^{-1}$ for the 20% doped material. Thus, for a 1 cm at 20% Ho:BYF, over 67% of the incident light intensity at 890 nm is absorbed.

In a preferred embodiment corresponding to the scheme depicted in FIG. 5, the 890 nm excitation source has a long pulse but is capable of delivering enough energy within the pulse to exceed the saturation density of the gain material by a substantial factor. In this case, as In a preferred embodiment corresponding to the scheme depicted in FIG. 5, the 890 nm duration long as the repetition rate is smaller than the inverse of the lower state lifetime, lasing conditions can be realized such that the upper laser level is directly and continuousely populated to achieve and maintain inversion throughout the pump pulse duration. In this manner of operation, stimulated emission can be created and sustained even from levels lacking sufficiently long fluorescence lifetimes relative to a lower laser level. These are important considerations for situations when long pulse pumping is desired as a way to lower the incident peak power thereby reducing the risk of optical damage to coatings. Peak power damage thresholds are known to be smaller for mid-infrared coatings and damage can become an especially significant issue in endpumped configurations, where sensitive dichroic coatings are typically employed. On the other hand, longer pump pulse durations reduce the available peak power, so the long pulse pump source must be capable of delivering enough energy per pulse to overcome the threshold (defined by saturation power) by at least a factor of 5 to 10, thereby sustaining laser operation. Since saturation power density is inversely proportional to the level lifetime, and the $^5I_6$ lifetime is relatively short—only about 40 $\mu$s in 10% Ho:BYF—the saturation power density for the transition is estimated to be as high as 100 kW/cm$^2$. Therefore narrow-band pumping with a long (10's of microseconds) pulse require a source scalable to correspondingly high energies. Flashlamp-pumped Cr:LiSAF is one such source, as it can deliver well over 0.5 J with a beam quality that is good enough to allow focusing to small spot, thus achieving the requisite power densities within the gain material.

Figure 7:
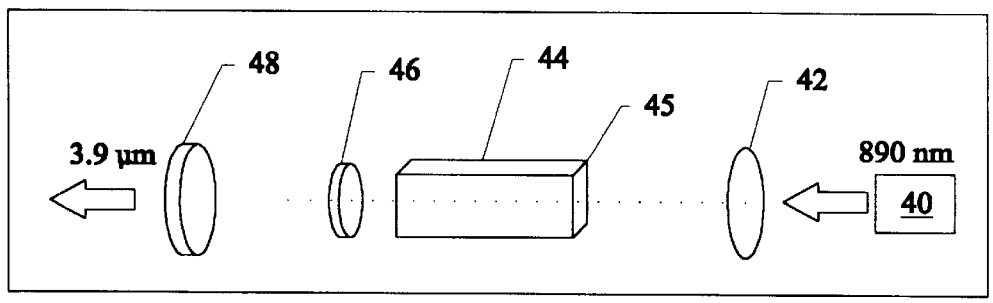
FIG. 7 shows a schematic of a laser oscillator for generating radiation at 3.9 µm from Ho:BYF using long pulse resonant pumping at 890 nm.

FIG. 7 is a schematic for a 3.9 $\mu$m Ho:BYF laser end-pumped at a wavelength of 890 nm. As shown in FIG. 7, the pump laser 40 comprises, in a preferred embodiment a Cr:LiSAF laser which is operated in a free running mode with a pulse duration of approximately 50 $\mu$s. In this mode, the pulse format is a series of relaxation oscillations, and the beam quality is several times the diffraction limit. Also shown in FIG. 7 are optics 42 to couple and focus the 890 nm radiation into the Ho:BYF rod 44, which in this illustrative example was approximately 2 cm long, giving about 67% absorption. On one input end, the Ho:BYF crystal coating 45 is applied to transmit the 890 nm beam while providing high reflection at 3.9 $\mu$m. The rod on this end had a weak curvature of about 1 m. An output coupler 46 is shown which has a reflectivity typically between 95 and 99% at 3.9 $\mu$m. A longpass filter 48 is placed at the output end to suppress radiation below 3.2 $\mu$m. The output energy at 3.9 $\mu$m was measured with a fast HCT detector.

Figure 8:
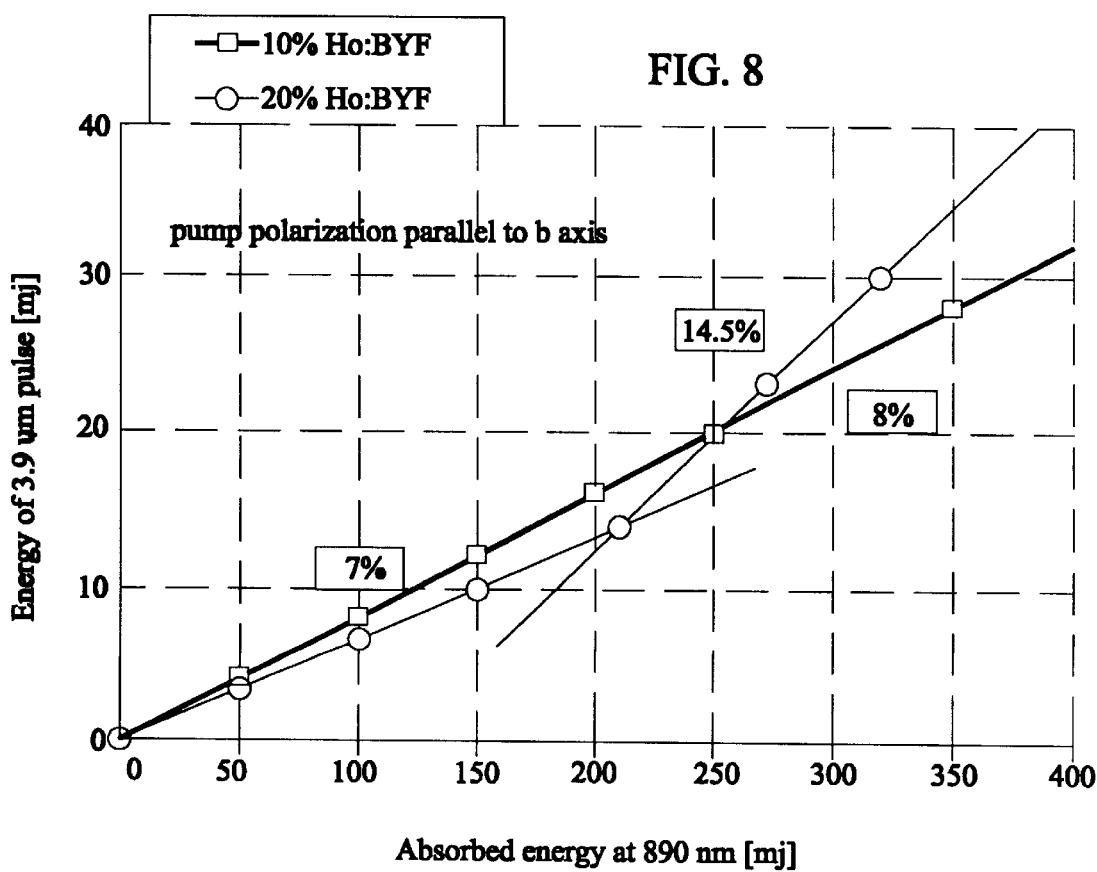
FIG. 8 shows a plot of the 3.9 µm output energy as a function of 890 nm absorbed input energy for 10% and 20% Ho:BYF pumped by a 50 µs Cr:LISAF laser.

FIG. 8 shows plots of the measured output energy at 3.9 $\mu$m as a function of absorbed 890 nm pump energy for the 10% at two output mirror reflectivities and for the two polarizations of the 20% Ho:BYF, each at 95% reflectivity. As the Figure shows, output energies of over 20 mJ were measured for the a 20% Ho:BYF sample, corresponding to 4.7% slope efficiency. It is noted that the HR coatings used in this experiment were of poor quality. It is projected that better quality coatings and more optimized cavity designs could produce 3.9 $\mu$m energies in excess of 50 mJ and slope efficencies approaching 10%.

In alternative embodiments of the system of FIG. 5 other 890 nm pump lasers could be utilized including other Cr-doped lasers, Ti:sapphire (lamp or laser-pumped), or high power diode laser arrays. Of these, the latter is highly attractive because of the high efficiencies available from semiconductor lasers. However, diode laser arrays with high power densities (approaching 1 kW/cm2) would be required, assuming pulse durations of about 100 ms. Diodes with higher brightness and more output power are expected to become commercially available in the near-term lasers.

Figure 9:
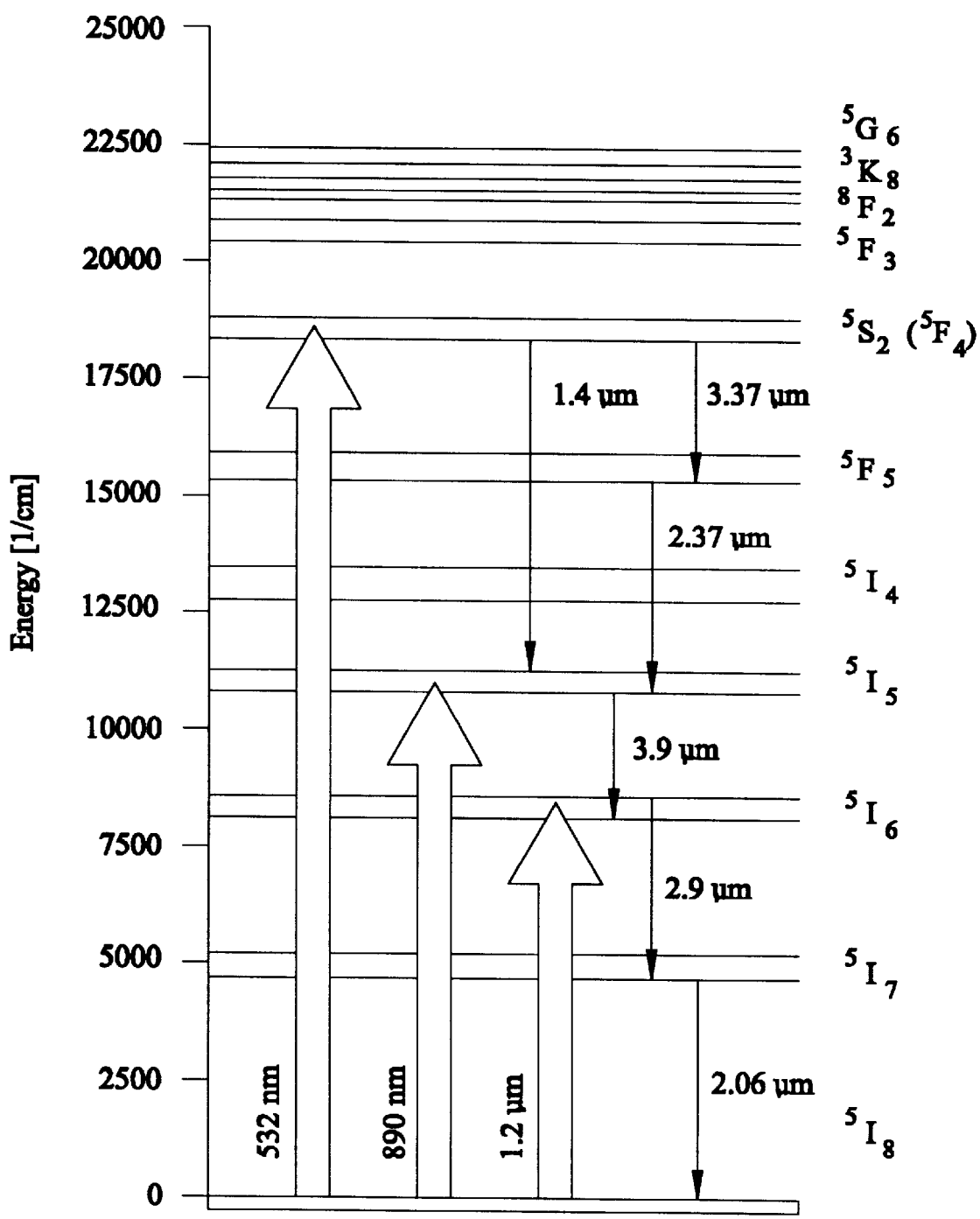
FIG. 9 shows shows several two options for generating radiation at 2.9 µm from resonantly pumped Ho-doped fluoride laser.

FIG. 9 shows a number of options for producing radiation at 2.9 $\mu$m from Ho-doped fluorides using the principles described in this invention. For example, cavity coatings can be selected to generate 2.9 $\mu$m laser pulses as the third wavelength in the 1.4 and 3.9 mm cascade sequence produced by pumping the $^5S_2$ level at 532 nm. Other coatings can be used to produce alternative cascades, including the three line transitions at 2.37, 3.9 and and 2.9 $\mu$m. Still different optics would allow radiation at 2.9 $\mu$m to be produced directly using, for example, the same 890 nm long pulse pump employed in demonstrating 3.9 $\mu$m lasing, or alternatively a 1.2 $\mu$m pump to directly excite the $^5I_6$ level. Available lasers at this wavelength include Raman fiber lasers (which can be tuned to a resonance and are now becoming available with high powers) and tunable fosterite laser.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A laser source for generating at least one infared wavelength, comprising in combination:

a pump source having peak density that overcomes a threshold of a selected laser transition;

means for coupling radiation from the pump source into a laser cavity;

a gain material of homium-doped flouride with the laser cavity having a dopant concentration greater than 2 atomic percent holmium; and optic means for generating at least one wavelength between approximately 1.4 $\mu$m and approximately 4 $\mu$m from said source.

2. The laser source of claim 1, wherein the optic means is configured to generate at least two wavelengths.

3. The laser source of claim 2, wherein the two wavelengths include:

approximately 1.4 $\mu$m and approximately 3.9 $\mu$m.

4. The laser source of claim 2, wherein the two wavelengths include:

approximately 2.9 $\mu$m and approximately 3.9 $\mu$m.

5. The laser source of claim 1, wherein the dopant concentration includes:

greater than 2 up to approximately 10 atomic percent holmium.

6. The laser source of claim 1, wherein the dopant concentration includes:

approximately 10 to approximately 20 atomic percent holmium.

7. The laser source of claim 1, wherein the dopant concentration includes:

greater than approximately 20 atomic percent holmium.

8. The laser source of claim 1, wherein the pump source includes:

a narrow band source emitting at approximately 532 nm.

9. The laser source of claim 1, wherein the pump source is:

a frequency-doubled Nd:YAG laser.

10. The laser source of claim 1, wherein the pump source includes:

a narrow band source emitting at approximately 890 nm.

11. The laser source of claim 1, wherein the pump source is: a Cr-doped laser.

12. The laser source of claim 1, wherein the pump source is: a Ti doped laser.

13. The laser source of claim 1, wherein the pump source is chosen from one of:

a diode laser and a diode laser array.

14. The laser source of claim 1, wherein the pump source includes:

a narrow band source emitting at approximately 1.2 microns.

15. The laser source of claim 1, wherein the pump source includes:

a fiber laser.

16. The laser source of claim 1, wherein the optic means is configured to generate a wavelength of: approximately 2.9 μm.

17. The laser source of claim 1, wherein the optic means generates a wavelength of: approximately 3.9 μm.

18. The laser source of claim 1, wherein the pump pulse duration provides a switch of said laser transition.

19. The laser source of claim 1, wherein the pump pulse duration provides operation at high energy densities.

20. The gain material of claim 1, wherein the holmium-doped flouride is selected from one of:

Ho;BYF, Ho:YLF, HoNaYF and Ho:KYF.

21. The method of claim 20, wherein the pump source in step(a) a Ti doped laser.

22. The method of claim 20, wherein the pump source in step(a) is chosen from one of:

a diode laser and a diode laser array.

23. The method of claim 20, wherein the pump source in step(a) includes:

emitting at approximately 1.2 microns.

24. The method of claim 20, wherein the pump source in step(a) is a fiber laser.

25. The method of claim 20, wherein the generating step(c) includes:

a wavelength of approximately 2.9 μm.

26. The method of claim 20, wherein the generating step(c) includes:

a wavelength of approximately 1.4 μm.

27. The method of generating at least one infrared wavelength form a laser source, comprising the steps of:

(a) pumping a gain material of holmium(Ho$^{3+}$) doped flouride with a pump source having a wavelength corresponding to a resonance of the gain material, the pump source having a peak power density that overcomes a threshold of selected laser transition, the holmium doped flouride having a dopant concentration greater than approximately 2 percent by weight of holmium;

(b) adjusting the concentration of the holmium to maximize absorption of the pump source wavelength; and (c) generating at least one wavelength between approximately 1.4μm and approximately 4 μm.

28. The method of claim 22, wherein step(c) further includes:

generating at least two wavelengths.

29. The method of claim 23, wherein the two wavelengths include:

approximately 1.4 μm and approximately 3.9 μm.

30. The method of claims, wherein the two wavelengths include:

approximately 2.9 μm and approximately 3.9 μm.

31. The method of claim 22, wherein the Ho dopant concentration in step(a) includes:

approximately 2 to approximately 10 percent atomic holmium.

32. The method of claim 22, wherein the Ho dopant concentration in step(a) includes:

approximately 10 to approximately 20 percent by weight holmium.

33. The method of claim 22 wherein the Ho dopant concentration in step(a) includes:

greater than approximately 20 percent by weight holmium.

34. The method of claim 22, wherein the pump source in step (a) includes:

emitting at approximately 532 nm.

35. The method of claim 22, wherein the pump source in step(a) is a frequency-doubled Nd: YAG laser.

36. The method of claim 22 wherein the pump source in step (a) includes:

emitting at approximately 890 nm.

37. The method of claim 22, wherein the pump source in step(a) is a Cr-doped laser.

38. The method of claim 20, wherein the generating step(c) includes:

a wavelength of approximately 3.9 μm.

39. The method of claims 33, wherein the pulse duration provides a gain switch of said laser transition.

40. The method of claim 33, wherein the pump pulse duration provides operation at high energy densities.

41. The method of claim 21, wherein the holmium-doped flouride is selected from one of:

Ho:BYF, Ho:YLF, Ho-NaYF and Ho:KYF.

* * * * *